United States Patent
Bshara et al.

(10) Patent No.: US 10,255,210 B1
(45) Date of Patent: Apr. 9, 2019

(54) ADJUSTING ORDER OF EXECUTION OF A TARGET DEVICE

(71) Applicant: Amazon Technologies, Inc., Seattle, WA (US)

(72) Inventors: Nafea Bshara, San Jose, CA (US); Guy Nakibly, Kedumim (IL); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 15/058,053

(22) Filed: Mar. 1, 2016

(51) Int. Cl.
*G06F 13/36* (2006.01)
*G06F 13/42* (2006.01)
*G06F 13/362* (2006.01)
*G06F 13/40* (2006.01)

(52) U.S. Cl.
CPC ........ *G06F 13/362* (2013.01); *G06F 13/4068* (2013.01); *G06F 13/42* (2013.01)

(58) Field of Classification Search
CPC ..... G06F 13/362; G06F 13/4068; G06F 13/42
USPC .......................................................... 710/111
See application file for complete search history.

(56) References Cited

U.S. PATENT DOCUMENTS

| | | | |
|---|---|---|---|
| 6,647,450 B1 * | 11/2003 | Kaplinsky | G06F 13/4204 710/300 |
| 6,733,208 B2 * | 5/2004 | Stockstill | B63B 35/03 405/166 |
| 6,988,173 B2 | 1/2006 | Blake et al. | |
| 7,043,593 B1 * | 5/2006 | Tischler | G06F 13/161 710/306 |
| 7,124,110 B1 * | 10/2006 | Kemp, II | G06F 9/546 705/37 |
| 7,130,953 B2 | 10/2006 | Schoner et al. | |
| 7,392,353 B2 * | 6/2008 | Barrett | G06F 13/1626 710/244 |
| 7,395,391 B2 | 7/2008 | Zohar et al. | |
| 7,712,006 B1 * | 5/2010 | Miller | G06F 13/4273 714/750 |
| 7,945,469 B2 | 5/2011 | Cohen et al. | |
| 8,200,879 B1 | 6/2012 | Falik et al. | |
| 8,589,549 B1 | 11/2013 | Vermeulen et al. | |
| 8,694,705 B2 * | 4/2014 | Hara | G06F 13/362 710/107 |
| 9,274,586 B2 | 3/2016 | Iyer et al. | |
| 9,929,743 B1 * | 3/2018 | Acuna-Rohter | H03M 7/30 |
| 9,934,184 B1 * | 4/2018 | Nakibly | G06F 13/4054 |
| 2007/0021970 A1 * | 1/2007 | Schreter | G06Q 20/00 719/316 |

(Continued)

OTHER PUBLICATIONS

U.S. Appl. No. 14/865,431, filed Sep. 25, 2015, Titled: Distributed Ordering System.

*Primary Examiner* — Christopher B Shin
(74) *Attorney, Agent, or Firm* — Kilpatrick Townsend & Stockton LLP

(57) ABSTRACT

A master device transmits a transaction to a target device. The transaction includes a transaction identifier. An ordering message is sent to the target device over a bus that is different than a communication channel that the transaction is transmitted over. The ordering message includes the transaction identifier. The target device adjusts an order of execution of the transaction by the target device based at least in part on receiving the ordering message.

21 Claims, 9 Drawing Sheets

(56) References Cited

U.S. PATENT DOCUMENTS

| | | | |
|---|---|---|---|
| 2007/0209038 A1* | 9/2007 | Fuchs | G06Q 30/06 |
| | | | 719/313 |
| 2008/0005490 A1 | 1/2008 | Shiraki et al. | |
| 2008/0040523 A1* | 2/2008 | Bruce | G06F 13/364 |
| | | | 710/110 |
| 2008/0114625 A1 | 5/2008 | Kline et al. | |
| 2008/0209418 A1 | 8/2008 | Liu et al. | |
| 2009/0083651 A1 | 3/2009 | Kim et al. | |
| 2009/0299811 A1 | 12/2009 | Verfuerth et al. | |
| 2011/0185365 A1 | 7/2011 | Bauer et al. | |
| 2012/0331034 A1 | 12/2012 | Fawaz et al. | |
| 2013/0083794 A1* | 4/2013 | Lakshmanamurthy | |
| | | | H04L 12/28 |
| | | | 370/390 |
| 2013/0086586 A1* | 4/2013 | Lakshmanamurthy | |
| | | | G06F 15/7864 |
| | | | 718/100 |
| 2014/0033209 A1 | 1/2014 | Lih et al. | |
| 2014/0181340 A1* | 6/2014 | Parthasarathy | G06F 13/14 |
| | | | 710/107 |
| 2015/0301962 A1* | 10/2015 | Laughton | G06F 13/1626 |
| | | | 710/112 |
| 2015/0355938 A1* | 12/2015 | Jokinen | G06F 9/4881 |
| | | | 718/107 |
| 2016/0124883 A1 | 5/2016 | Thompson et al. | |

\* cited by examiner

ADJUSTING ORDER OF EXECUTION OF A TARGET DEVICE

BACKGROUND

Computing systems often include one or more master devices and one or more target devices. Master devices include components in the computing system that are capable of originating transactions, such as read and write transactions. The master devices may typically operate on the data that they read and write. Target devices include components in the computing system that may operate on and/or store data. Master devices typically direct read and write transactions to target devices. In some cases, these read and write transactions either affect the operation of the target device or extract data from the target device, or there is some combination of manipulating the target device and getting information from the target device. In other cases, such as with storage devices, the read and write transactions provide a way for the master devices to transfer data from the master devices to the target devices and back.

BRIEF DESCRIPTION OF THE DRAWINGS

Various embodiments in accordance with the present disclosure will be described with reference to the drawings, in which.

DETAILED DESCRIPTION

Figure 1:
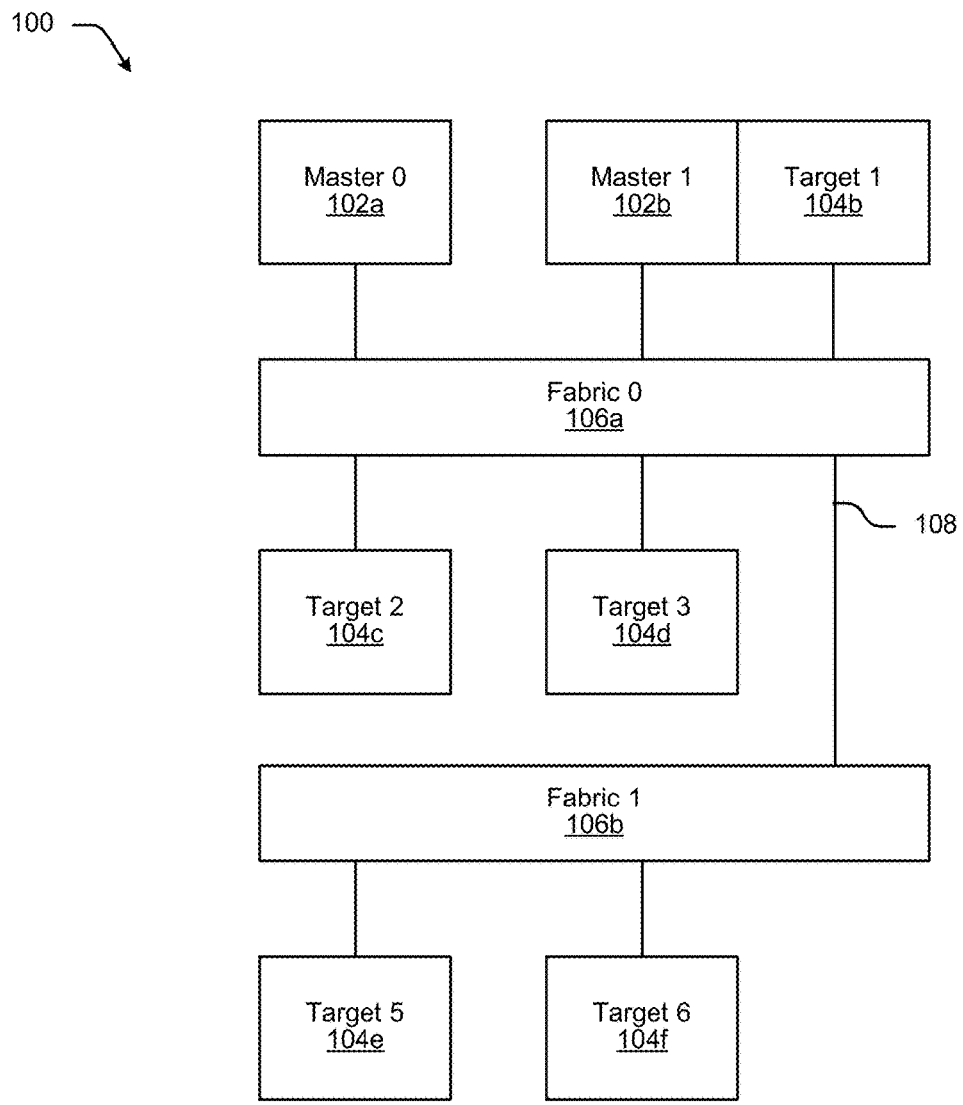
FIG. 1 illustrates an example of a computing system in which master devices and target devices communicate to exchange information.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems often include multiple master devices and multiple target devices. Master devices include components in the computing system that are capable of originating transactions, such as read and write transactions. The master devices may typically operate on the data that is read and written. Examples of master devices include processor cores, processors, and server computers, among others. Target devices include components in the computing system that may operate on and/or store data. Examples of target devices include interface blocks for communicating with various interfaces (e.g., buses), peripheral devices, and remote network devices. In some cases, a master device can also be a target device. In these cases, the master device can both originate transactions and respond to transactions.

When a computing system includes multiple master devices, it may be preferable in some examples for the transactions directed at a target device to be executed by the target device in the order in which the transactions were generated. This is so that a transaction to a specific address that follows an earlier transaction to the same address accesses the correct data. For example, when a write transaction is followed by a read transaction to the same address, the read transaction should, in most cases, read the data that was written by the write transaction.

Once a target device receives a transaction from the one or more master devices, it may be preferable in some examples to adjust the order of execution of the transactions by the target device. For example, when the target device receives a first transaction, it may be advantageous to cancel the first transaction. Or, when the target device receives a first transaction and a second transaction, it may be advantageous to set the order of execution of the first transaction and the second transaction, even when the order of execution by the target device is different from the order that the first transaction and the second transaction are received by the target device.

When a computing system includes multiple master devices, the computing system may need to include a mechanism that keeps transactions from different master devices in order. Such mechanisms typically implement an ordering model. An ordering model is a set of rules that determines the order in which transactions should be executed by a target device. While ordering models may avoid the problem of transactions accessing the wrong data, in some cases ordering models have a negative impact on overall system latency. The computing system may have an inherent latency between the time a master device issues a transaction and the time that the master device receives a response to this transaction. This latency may be due to the time required to transfer the transaction to the target device, the time required by the target device to execute the transaction, and the time required for a response to transfer from the target device to the master device. This latency may be compounded when a transaction is made to wait due to the ordering model.

A distributed ordering system provides one mechanism for maintaining the order of transactions in a computing system, possibly without adding significant latency to the overall system. The distributed ordering system involves distributing ordering tasks among master devices in the system. The distributed ordering system further includes token busses. The token busses may be point-to-point, unidirectional communication channels between each master device and each target device.

A distributed ordering system with token busses may change the manner in which transactions are executed. A master device may transmit some number of transactions to a target device, but the target device may not execute these transactions at the time that they are received. The master device may indicate to the target device at a later time to execute those transactions, and may further indicate how many transactions to execute. The master device may use a token bus to make this indication. Once the target device has executed the transactions from the master device, the target device may indicate to the master device how many transactions it has executed. Receipt of this number indicates to the master device that at least some of its transactions have completed. Subsequently, the master device may signal to other master devices that they may proceed with their own transactions. These other master devices may have also transmitted transactions to the target device. As with the first master device, the target device may not execute these transactions until told to do so by the other master device that originated the transaction. The other master device may do so with its own token bus to the target.

Distributed ordering systems may be particularly applicable to certain computing systems, specifically systems-on-a-chip (SoCs) and systems consisting of discrete components on a single board or within a single chassis. Distributing ordering tasks among master devices and the use of token buses may provide a system of maintaining transaction order without significantly impacting the overall system latency. In many cases, transactions can be issued concurrently, thus reducing the latency at least to the response time. Furthermore, with the information disclosed herein, a distributed ordering system may be simple to implement, requiring only a simpler ordering model and the addition of token buses.

Additionally, the instant disclosure includes systems and methods of adjusting an order of execution of transactions by a target device. These systems and methods may be particularly applicable to certain computing systems, specifically systems-on-a-chip (SoCs), processors, ASICs, FPGAs, and systems consisting of discrete components on a single board or within a single chassis.

FIG. 1 illustrates an example of a computing system 100 in which master devices and target devices communicate to exchange information. The example of FIG. 1 illustrates multiple master devices 102*a-b* and multiple target devices 104*b-f*. The master devices 102*a-b* may communicate with the target devices 104*b-f* over one or more communication fabrics 106*a-b*. In this example, Master 0 102*a*, Master 1 102*b*, and Target 1 104*b* communicate with the rest of the computing system 100 over Fabric 0 106*a*. Similarly, Target 2 104*c* and Target 3 104*d* communicate over Fabric 0. Target 5 104*e* and Target 6 104*f* communicate with the rest of the computing system 100 using Fabric 1 106*b*. In this example, Fabric 0 106*a* and Fabric 1 106*b* are configured to communicate with each other using a link 108. The link 108 provides a communications route between the devices connected to Fabric 0 106*a* and the devices connected to Fabric 1 106*b*.

A computing system such as is illustrated in FIG. 1 may be found in many different applications. For example, the computing system 100 may be implemented in a system-on-a-chip. A SoC is usually a single chip that incorporates multiple operating blocks. For example, a SoC may include multiple master devices in the form of multiple processor cores. Furthermore, the SoC may include multiple target devices in the form of interface blocks, such as for example a Universal Serial Bus (USB) interface, an Inter-Integrated Circuit (I2C) interface, a network interface, and so on. The SoC may further include a communication fabric in the form of a bus, such as for example an Advanced eXtensible Interface (AXI) bus, that the processor cores can use to communicate with the interface blocks.

Another example application of the computing system 100 is a server computer. A server computer may include multiple processors as master devices and multiple peripheral devices as target devices. Peripheral devices extend and/or modify the operating of the computing system, and may include, for example, speakers, displays (e.g., monitors), printers, storage devices, network adapters, and so on. The server computer may further include a bus as a communications fabric, such as for example a Peripheral Component Interconnect (PCI) bus.

One more example application of the computing system 100 is a networked computing system. A networked computing system may include multiple server computers as master devices, where the server computers are connected to a network. The networked computing system may further include additional server computers connected to the network, as target devices. The target servers may be providing peripheral services, such as storage arrays. The networked computing system may employ a network, including possibly the Internet, as a communication fabric between the master server computers and the target server computers.

Returning to FIG. 1, the master devices 102*a-b* generally originate transactions. These transactions may be read or write transactions. Read transactions generally read data from one or more addresses. Write transactions generally write data to one or more addresses. The computing system 100 may include variations of read and write transactions, such as burst transactions (a read or write involving multiple cycles of data associated with a sequence of addresses), transactions for which the initiating master device expects a response, and transactions for which the initiating master device does not expect a response, among others. Master devices generally operate on the data being read and/or written. In some cases, master devices can also be target devices. For example, Master 1 102*b* includes a target device Target 1 104*b*. Master 1 102*b* thus can both initiate transactions and respond to transactions. In other words, a write or read transaction may be targeted at Master 1 102*b*, and Master 1 102*b* will respond, using its accompanying Target 1 104*b*. In contrast, Master 0 102*a* does not include an accompanying target device, and so may be configured to only initiate transactions, and not respond to them.

In some implementations, transactions from the master devices 102*a-b* may additionally or alternatively include control transactions and/or packetized data. Control transactions may include instructions for controlling a target device. In some cases, control transactions may have a different priority than read and write transactions; for example, control transactions may have a higher priority, and/or may be able to bypass read and write transactions and be handled first. Alternatively or additionally, control transactions may be queued differently or separately by a target device. Control transactions may, in some cases, be differentiated from read and write transactions by lacking a memory address. Packetized data may include data that has been packaged into a packet for transport over a packet-switched network. Packetized data typically includes a header portion and a payload portion, where the header portion provides information for getting the packet to its destination, and where the payload portion includes the transaction data. Packetized data, in many cases, may not include a memory address, at least in the header portion.

The target devices 104*b-f* react to read and write transactions initiated by master devices. The target devices 104*b-f* may each include an address space. A target device with an address space may be referred to as a memory-mapped device. A target device without an address space—which may be identified by a port, tag, single address, or other identifier—may be referred to as a non-memory-mapped device. The address space of a target device defines the addresses to which the target device may respond. For example, the Target 2 104*c* may have the address space starting at hexadecimal address 0x00001000 and ending at address 0x00001ffff (a total of 4096 addresses). Target 2 104c should respond to any transaction that is within its address space, such as for example address 0x00001004, assuming the address space provided by the prior example. In some cases, target devices also operate on data that is written to and read from them. In other cases, target devices only store data. Target devices generally respond to write and read transactions directed at them. For example, a target device responds to a read transaction with the data that was requested to be read. In some cases, if the target device experiences an error in reading the data, the target device may respond with an error code. For write transactions, in some cases, the target device may respond with an acknowledgement message that indicates that the target device has finished writing the data. In some cases, the target device may also send an error code when it experiences a problem writing the data.

The communication fabrics 106a-b provide a way for the master devices 102a-b and target devices 104b-f to communicate. Each of the master devices 102a-b and target devices 104b-f may be connected to at least one of the communication fabrics 106a-b. Examples of communication fabrics include busses, rings, switches, and networks, among others. A communication fabric can also be connected to another communication fabric. In the illustrated example, Fabric 0 106a is connected to Fabric 1 106b over a link 108. The link 108 may be a connection similar to the connections to the master devices 102a-b and target devices 104b-f, or may be a bridge connection, or a network connection, or some other linking mechanism. Linking the communication fabrics 106a-b may allow the computing system 100 to increase the number of devices that can be attached to the computing system 100. For example, if the number of devices attached to Fabric 0 106a has reached the maximum number of available connections, then any additional devices can be connected to Fabric 1 106b.

Transaction Ordering

Computing systems that include multiple master devices are common occurrences. When multiple master devices are going to initiate transactions to the same address, it may be necessary for these transactions to be executed by a target device in order. For example, a target device that receives a write transaction followed by a read transaction to the same address should, in many cases, execute the write transaction first, or else the read transaction will return old data. Similarly, a target device that receives a read transaction followed by a write transaction should execute the read transaction first, or else the target device will return modified data.

Computing systems typically solve transaction ordering issues by including an ordering model. An ordering model is a set of rules that determines the order in which transactions should be executed by a target device. For example, in some cases, ordering rules may determine that, for a read followed by a write, the write transaction should be executed first, so that the read transaction reads updated data. In some implementations, ordering rules are implemented in the master devices. This is because master devices typically have some knowledge between them of the proper order of the transactions that they will issue. In contrast, target devices may have little or no knowledge of other devices in the system. In a simple example of an ordering model, a master device may transmit a transaction, wait for a response, and only upon receiving a response may send another transaction. In this example, it may be that no other master device may transmit a transaction until the first master device's transaction is complete.

In some implementations, an ordering model may be defined by the specification that describes the communication between master and target devices. For example, a computing system may use the Peripheral Component Interconnect Express (PCIe) standard for its implementation for the interconnect between master and target devices. In this example, the PCIe specification may define the ordering rules for transactions transmitted across a PCIe communication fabric. In some implementations, the processor architecture may define the ordering rules for master devices. For example, the ordering rules for an ARM processor may be defined by the ARM processor specification. In other implementations, ordering rules may be defined for a specific implementation of a SoC or other computing system. For example, a SoC may be implemented using an AXI bus as the communication medium between master and target devices. In this example, the AXI bus may define the ordering rules. An example of AXI ordering rules are as follows: first, target devices that return responses are responsible for maintaining ordering between the transactions they receive; second, multiple transactions directed to the same location (e.g., a target address) should be handled in order by both the communication fabric and the recipient target device.

Figure 2:
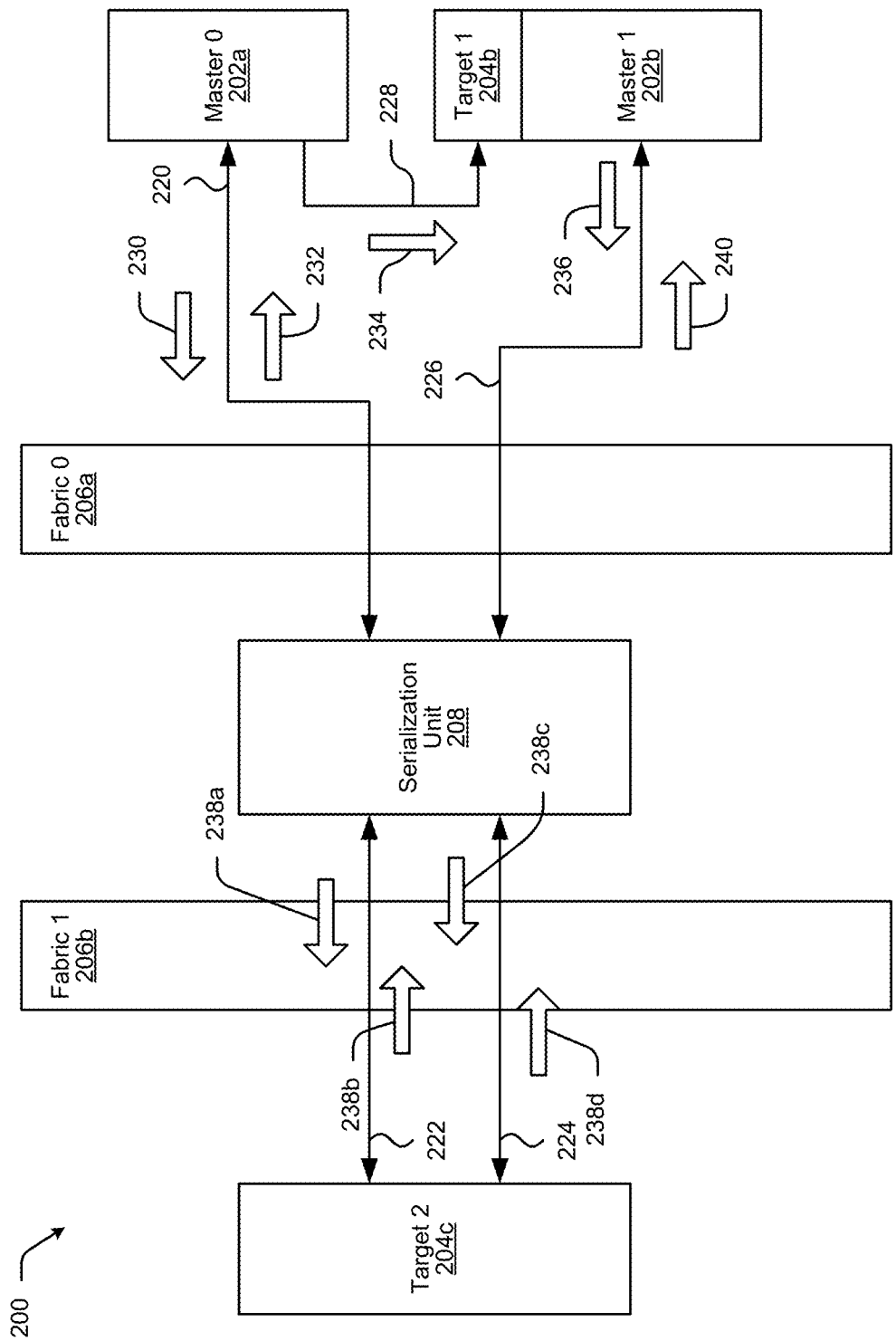
FIG. 2 illustrates an example of an approach for including an ordering model in a computing system.

FIG. 2 illustrates an example of an approach for including an ordering model in a computing system 200. The example of FIG. 2 illustrates two master devices 202a-b, Master 0 202a and Master 1 202b, in communication with a first communication fabric, Fabric 0 206a. Master 1 202b also includes an associated target device, Target 1 204b, for receiving transactions. Also illustrated is a target device, Target 2 204c, that is in communication with a second communication fabric, Fabric 1 206b. Between the two communication fabrics 206a-b is a serialization unit 208, which is explained in further detail below.

Master 0 202a may have a communication channel 220 for communicating with Target 2 204c. In this example, however, instead of communicating directly with Target 2 204c, Master 0 202a's communication channel 220 is instead connected to the serialization unit 208. The serialization unit 208, in turn, may have its own communication channel 222 with Target 2 204c. Master 0 202a may not be aware that its communication channel 220 is connected to the serialization unit 208 rather than to Target 2 204c. Master 1 202b also may also have a communication channel 226 for communicating with Target 2 204c that is instead connected to the serialization unit 208. The serialization unit 208 similarly provides a separate communication channel 224 to Target 2 204c.

Master 0 202a may also have a communication channel 228 for communicating to other master devices. Master 0 202a may use the communication channel 228 to send messages and/or notifications to other master devices. In the illustrated example, the communication channel 228 from Master 0 202a is connected to Target 1 204b, the target device associated with Master 1 202b. Master 1 202b may include Target 1 204b in order to be able to receive messages and notifications from other master devices.

While the communication channels 220, 222, 224, 226 are illustrated as separate connections, it need not be the case that they are separate connections. In some cases, the master devices 202a-b may share a communication channel to communicate with the serialization unit 208. Similarly, in some cases, the serialization unit may have a single communication channel for communicating with Target 2 204c. Also, while the illustrated example includes two communication fabrics 206a-b, in some cases the computing system 200 may include only one communication fabric. In such cases, each of the master devices 202a-b, the target device 204c, and the serialization unit 208 communicate with each other through a single fabric. In other cases, the computing system 200 may include more than two inter-linked communication fabrics.

The serialization unit 208 in this example is responsible for maintaining the ordering model for the computing system 200. The serialization unit 208 may receive some or all of the transactions directed to Target 2 204c. As explained in an example provided below, the serialization unit 208 may transmit these transactions to Target 2 204c in the correct order, and forward responses from Target 2 204c to the master devices 202a-b.

An example of the operation of the serialization unit 208, and its effect on the behavior of the master devices 202a-b, is described in the following example steps. First, at step 230, Master 0 202a transmits a transaction. For purposes of this example, this transaction is a write to hexadecimal address 0x0001234, which is within the address space of Target 2 204c. The write transaction is received by the serialization unit 208. At step 232, the serialization unit 208 sends an acknowledgement to Master 0 202a. This acknowledgment appears to Master 0 202a as if it came from Target 2 204c, and indicates to Master 0 202a that its write transaction has completed. At step 232, however, the serialization unit 208 may not yet have done anything with the write transaction, but Master 0 202a can now proceed as if the write transaction has completed.

At step 234, Master 0 202a may notify other master devices that it has finished writing to address 0x00001234. Specifically, Master 0 202a may notify Master 202b by transmitting, for example, a doorbell or a similar message over its communication channel 228 to other master devices. In this example, this notification may be received by Master 1 202b, by way of Target 1 204b. In cases where there are other master devices in the computing system 200, those master devices may also be notified in a similar fashion.

Having been notified that it may now do so, Master 1 202b may, at step 236, transmit a read transaction to address 0x00001234. The read transaction will also be received by the serialization unit 208. The serialization unit 208, however, will not transmit an acknowledgment to Master 1 202b right away, as it did with the write transaction from Master 0 202a, because the serialization unit 208 must first read the requested data from Target 2 204c.

At step 238a, the serialization unit 208 transmits the write transaction from Master 0 202a to Target 2 204c. The serialization unit 208 may do this right after receiving the write transaction, or some time later. In some cases, Target 2 204c may be busy, and the serialization unit 208 may have to wait until Target 2 204c is ready to receive the write transaction. After Target 2 204c has executed the write transaction, Target 2 204c may, at step 238b, transmit an acknowledgement to the serialization unit 208.

At this point, the serialization unit 208 may know that the write transaction to address 0x00001234 has completed. With the write transaction complete, the read of address 0x00001234 may proceed. At step 238c, the serialization unit 208 may transmit the read transaction from Master 1 202b to Target 2 204c. At some point thereafter, the serialization unit 208 may, at step 238d, receive the data read from address 0x00001234 by Target 2 204c. At step 240, the serialization unit 208 may transmit the read data to Master 1 202b.

After having transmitted the read transaction at step 236, Master 1 202b may have moved on to other activities, expecting the read data to arrive at some later time. In some cases, however, Master 1 202b may not be able to proceed without the read data. In these cases, Master 1 202b may be in an idle state while it waits for Target 2 204c to execute both the write transaction and the read transaction. Thus the serialization unit 208 may improve some system latency, such as for Master 0 202a, which was able to move on to other activities soon after transmitting its write transaction. But the serialization unit 208 does not improve other system latencies, such as for Master 1 202b, which must wait for both the write and the read transactions to complete.

The serialization unit 208 may also be complex to implement. The serialization unit 208 may have to maintain the transaction order for many master devices. For example, some SoCs may include up to 64 processor cores. The serialization unit 208 may also have to receive transactions from all master devices in the computing system, which may place limitations on either the number of devices that can be interconnected in the system, or the throughput of transactions to a target device, or both. In some implementations, the computing system may need a serialization unit for each target device, thus possibly increasing the complexity of the system.

As noted above, the serialization unit 208 of FIG. 2 may at times not be able to transmit transactions to Target 2 204c right away. For example, Target 2 204c may be busy working on prior transactions, and/or Target 2's 204c incoming transaction buffer may be full. While the serialization unit 208 waits for Target 2 204c to be ready to accept more transactions, one or more master devices may be idle, waiting for their transactions to complete. This situation could happen even without a serialization unit. For example, Master 0 202a may have to wait for Target 2 204c to be ready to receive a transaction before it can send its write transaction. Alternatively, in other implementations, Master 0 202a may transmit its write transaction when Target 2 204c is not ready to receive it. In these implementations, Master 0 202a may have to wait even longer for its transaction to complete. Alternatively, Target 2 204c may simply drop the write transaction, without notifying Master 0 202a. In this case, Master 0 could reissue the write transaction, but not until after, for example, a timer has expired. These situations, where master devices may be blocked or waiting because the target device is busy and cannot accept more transactions, are sometimes referred to as "head-of-line" blocking. This term refers to the fact that no transactions may advance until the transaction at "the head of the line" (e.g., the oldest transaction received by the target) has completed.

Credit Systems

Figure 3:
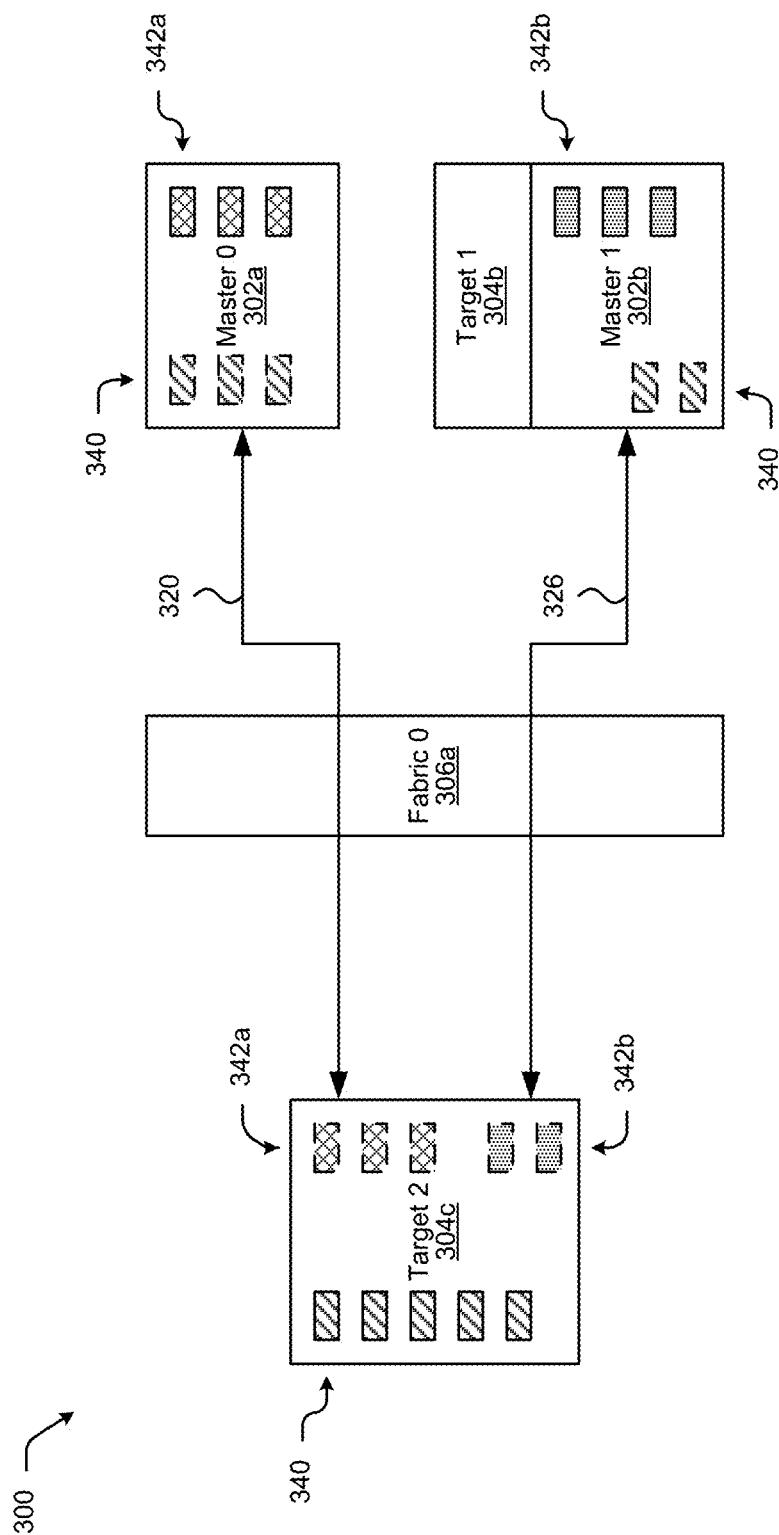
FIG. 3 illustrates one example of one implementation of a credit system.

Credit systems provide one way to manage head-of-line blocking. FIG. 3 illustrates one example of one implementation of a credit system. FIG. 3 illustrates a computing system 300 that includes two master devices 302a-b and a target device 304c. The master devices 302a-b communicate with the target device 304c over a communication fabric 306a. Master 1 302b also includes a target device 304b for responding to transactions. Each of the master devices 302a-b have a communication channel 320, 326 for communicating with the targeted device 304c. While the communication channels 320, 326 are illustrated as separate channels, in some cases they may be a single share channel.

Credits indicate how many transactions a device can accept. In the example of FIG. 3, Target 2 304c has five credits 340. These five credits 340 can be used by Target 2 304c to indicate how many transactions it can accept at a given time. For example, Target 2 304c may send three of its credits 340 to Master 0 302a and send the remaining two credits 340 to Master 1 302b. Master 0 302a is thus informed that it can send up to three transactions to Target 2 304b, while Master 1 302b is informed that it can send up to two transactions to Target 2 304b. With each transaction sent, the master devices 302a-b also return a credit 340 to Target 2 304c. When a master device 302a-b runs out of credits 340, it should stop sending transactions to Target 2 304c. When Target 2 304c completes a transaction, it frees up a credit 340. Freed credits 340 may be sent to any of the master devices 302a-b, and not necessarily to the master device 302a-b that last held that credit.

The master devices 302a-b may also have credits 342a-b. These credits 342a-b may be used by the master devices 302a-b to indicate how many transaction responses each master device 302a-b can accept. For example, in the illustrated example, Master 0 302a has three credits 342a, and may send all three of these credits 342a to Target 2 304c. This indicates to Target 2 304c that Master 0 302a can accept up to three transaction responses. Master 1 302b also has three credits 342b, but in this example Master 1 302b only sends two of its credits 342b to Target 2 304c, possibly to reserve one credit 342b to send to another device. When Target 2 304c completes a transaction, it may send a credit 342a-b back to the master device 302a-b that issued that credit.

Credit systems may resolve at least some head-of-line blocking. Credits provide a way for master devices to possibly know in advance how many transactions a target device can accept. A master device may thus avoid sending transactions where those transactions may have to wait or may be dropped. The master devices may, in some cases, instead carry on with other operations.

Credit systems, however, do not usually resolve ordering issues. Credits provide master and target devices information about each other, and so may prevent these devices from transmitting transactions that cannot be reasonably quickly. Credits, however, do not typically provide information about the order of transactions. A computing system that includes a credit system thus may still need an ordering model to maintain the order of transactions.

While ordering models may resolve the problem of keeping transactions in order, in most cases ordering models are not likely to improve overall system latency. In some cases, ordering models are detrimental to overall system latency. System latency may be caused by many factors, including long latencies between a master device and a target device. It could take some time, in relative terms, for a master device that has issued a transaction to receive a response from a target device. In the meantime, the master device may, in some cases, be blocked from further activity. Moreover, it may be that, until the master device has received a response (regardless of whether the master device is blocked), other master devices may not be able to issue transactions. In this way, the latency between master devices and target devices is compounded, thus possibly increasing overall system latency.

Distributed Ordering System

Overall system latency can be improved by reducing the latency between master devices and target devices. Some approaches for reducing this latency include reducing the amount of time required for a transaction to transfer from a master device to a target device, reducing the time for the target device to execute the transaction, and/or reducing the time for the master device to receive a response from the target device. This may require careful system architecture and/or physical design.

Figure 4:
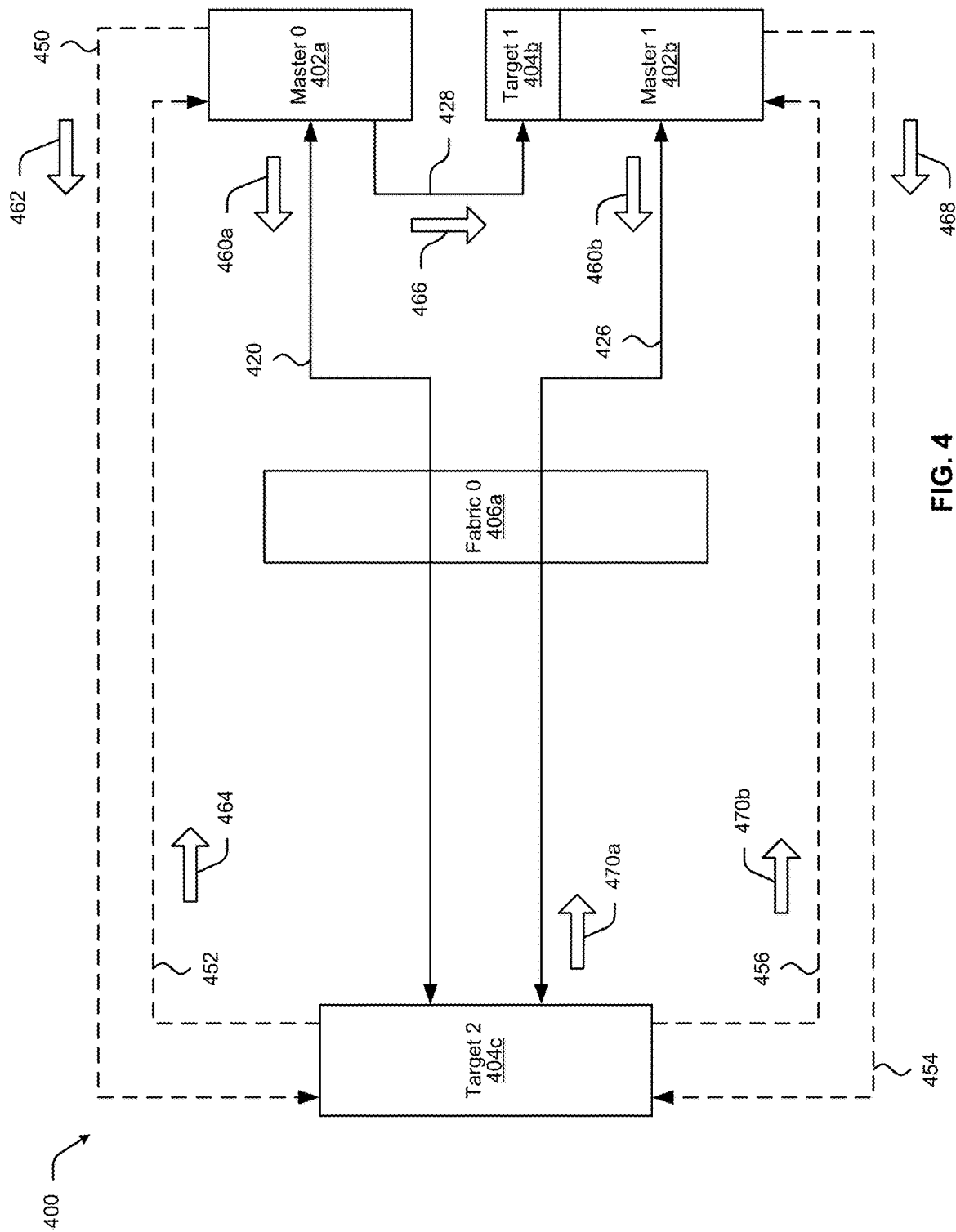
FIG. 4 illustrates on example of a computing system that includes a distributed ordering system.

Another approach is to reduce latency that may be caused by an ordering model. The ordering model may cause an ordering relationship between any two transactions. An ordering relationship may cause a transaction that could complete quickly complete more slowly because it must wait for another transaction to complete. For example, a transaction issued by a master device may be blocked behind one or more transactions that are directed to the same address. A distributed ordering system provides one method for reducing the latency that may be caused by an ordering model. FIG. 4 illustrates an example of a computing system 400 that includes a distributed ordering system. "Distributed" in this context means that transaction ordering is handled in a distributed fashion. As will be discussed in further detail below, in this example, transaction ordering tasks are distributed among the master devices 402a-b, which may act cooperatively to ensure that transactions are executed by a target 404c in the desired order.

The example of FIG. 4 illustrates two master devices 402a-b, Master 0 402a and Master 1 402b, in communication with a communication fabric, Fabric 0 406a. Master 1 402b also includes an associated target device, Target 1 404b, for receiving transactions. Also illustrated is a target device Target 2 404c, which is also in communication with the communication fabric 406a. Master 0 402a may have a communication channel 420 for communicating with Target 2 404c, which passes through the communication fabric 406a. Master 1 402b may also have a communication channel 426 for communicating with Target 2 404c. While the communication channels 420, 426 are illustrated separately, they may be separate connections, one shared connection, or a combination of separate and shared connections.

Master 0 402a may also have a communication channel 428 for communicating to other master devices. Master 0 402a may use the communication channel 428 to send messages and/or notifications to other master devices. In the illustrated example, the communication channel 428 from Master 0 402a is connected to Target 1 404b, the target device associated with Master 1 402b. Master 1 402b may include Target 1 404b in order to be able to receive messages and notifications from other master devices.

The example computing system 400 also includes token busses 450, 452, 454, 456. The token busses in this example are point-to-point connections between each of the master devices and Target 2 404c. "Point-to-point" in this context means a connection between only two devices. For example, a token bus 450 provides communication between Master 0 402a and Target 2 404c. In a similar fashion, a token bus 454 provides communication from Master 0 402b to Target 2 404c, and a separate token bus 456 provides communication from Target 2 404c to Master 0 402b. For purposes of this illustration, token busses 450,454 from the master devices 402a-b to Target 2 404c will be called "execute_token" busses, while the token busses 452, 456 will be called "release_token" busses.

In this example, the token busses 450, 452, 454, 456 are unidirectional. Thus there may be two token busses per master-target pair, one for each direction of communication. In some implementations, the token busses may be bidirectional, in which case each master-target pair requires only one token bus. In some implementations, separate token busses may be provided for read transactions and for write transactions. For example, Master 0 402*a* may have two execute_token busses to Target 404*c*. Similarly, Target 404*c* may have two release_token busses to Master 0 402*a*. In these implementations, there may thus be four token busses per master-target pair. In other implementations, there may be three token busses per master-target pair, for example if the target device uses only one release_token bus for both read and write transactions.

In most implementations, the token busses 450, 452, 454, 456 operate independently of the communication fabric 406*a*. For example, the token busses 450, 452, 454, 456 may be routed separately from the communication fabric 406*a*. This means that the data transferred over the token buses 450, 452, 454, 456 does not need to pass through the communication fabric 406*a* to reach its destination. This also means that, in at least some implementations, data transferred over the token busses 450, 452, 454, 456 can reach its destination much faster than data that must pass through the communication fabric 406*a*. In some implementations, the token busses 450, 452, 454, 456 may be asynchronous. This means that the driver of a token bus does not require a clock signal to drive data onto the token bus. This also means that the device at the receiving end of a token bus may receive data at any time, relative to its own clocks. An asynchronous bus may be easier to implement because such a bus may not need to meet the timing requirements imposed by clocks. Data can also possibly be transferred more quickly over an asynchronous bus than over the communication fabric 406*a*. The rate of data being transferred may be limited only by the rate at which the driver is able to place data onto the bus, and/or the rate at which the recipient can make use of the data.

In this example, the data transferred over the execute_token busses 450, 454 may indicate to Target 2 404*c* a number of transactions to execute. Similarly, the release_token busses 452, 456 may indicate to the master devices 402*a-b* a number of transactions executed. The operation of the token busses is discussed in further detail below.

In some implementations, the number transmitted over the token busses 450, 452, 454, 456 may be provided as a count. For example, Master 0 402*a* may transmit "3" over its execute_token bus 450 to indicate to Target 2 404*c* that Target 2 404*c* should execute three transactions. Alternatively, in some implementations, the number may be transmitted using a running count. For example, the current value on Master 0's 402*a* execute_token bus 450 may be "5." Master 0 402*a* may change the value being driven on its execute_token bus 450 to "8" to indicate that Target 2 404*c* should execute three transactions. In yet other implementations, the number may be transmitted as an incrementing value. For example, Master 0 402*a* may toggle its execute token bus from zero to one and back to zero three times to indicate to Target 2 404*c* that Target 2 404*c* should execute three transactions. In some implementations, the token bus in this last example may be synchronous.

In some implementations, the number transmitted over the token busses 450, 452, 454, 456 is transmitted using a Gray code (also called a reflected binary code). Gray code is a numeric system in which two successive numbers differ in only one binary digit. An example of a 3-bit Gray code is provided in Table 1. The Gray code values are given as binary digits. Other Gray code encodings are possible. Gray code encoding can be extended over any number of bits.

TABLE 1

Example encoding for a 3-bit Gray Code

| Decimal Value | Binary Value | Gray Code Value |
|---|---|---|
| 0 | 000 | 000 |
| 1 | 001 | 001 |
| 2 | 010 | 011 |
| 3 | 011 | 010 |
| 4 | 100 | 110 |
| 5 | 101 | 111 |
| 6 | 110 | 101 |
| 7 | 111 | 100 |

Gray code encodings may be useful when transferring multi-bit data asynchronously. Because only one bit changes from one value to the next, the chance that the recipient captures the wrong value is reduced. For example, to transition from "1" to "2" using ordinary binary values, two bits need to change ("001" to "010"). Because the token busses 450, 452, 454, 456 are not clocked, the recipient device may see an intermediate value before the desired value of "2" stabilizes. For example, the token bus may first read as "011" before settling on "010". The recipient device may be unsure if the correct value is "011" ("3") or "010". Using a Gray code, however, the transition from "1" to "2" would be from "001" to "011" or a change of only one bit. The recipient device is unlikely in this case to receive an intermediate value.

The following example steps illustrate how the token busses 450, 452, 454, 456 may be used to efficiently control the order of the transactions executed by Target 2 404*c*. The steps described are illustrative of one particular sequence of transactions. It is understood that the concepts illustrated by these steps can be applied to other sequences of transactions that may be executed by devices in the computing system 400.

At step 460*a*, Master 0 402*a* may transmit one or more transactions that are addressed to Target 2 404*c*. For purposes of this example, one transaction in the group is a write to address 0x0001234. The other transactions in the group may also be directed at address 0x00001234, or may be directed to other addresses within Target 2's 404*c* address space, though in this example there is only one write to 0x00001234. Target 2 404*c* may accept these transactions, but in most cases will not execute them. Target 2 404*c* will, in most cases, execute the transactions from Master 0 402*a* only after Master 0 402*a* has indicated that Target 2 404*c* should do so, as explained further below.

At step 460*b*, Master 1 402*b* may also transmit one or more transactions addressed to Target 2 404*c*. Master 1 402*b* may, in some cases, transmit these transactions at about the same time that Master 0 402*a* is transmitting its transactions, or shortly thereafter. In some cases, the transactions from Master 1 402*b* may be transmitted before the transactions from Master 0 402*a*. For purposes of this example, the first transaction from Master 1 402*b* is a read of address 0x00001234. The master devices 402*a-b* may know that this read should follow Master 0's 402*a* write to the address, so that Master 1 402*b* reads the most up-to-date value. Additionally, because the read of address 0x00001234 is first in the group from Master 1 402*b*, in this example no other transactions from Master 1 402*b* can be executed until the read has completed. Master 1 402*b* thus at this time may take no further action regarding its transactions. In some cases, after transmitting its transactions, Master 1 402*b* may move on to other activities. In other cases, Master 1 402*b* may wait for its transactions to complete before engaging in other operations. In the meantime, Target 2 404c may accept the transactions from Master 1 402b, and will not execute them until told to do so by Master 1 402b.

At step 462, Master 0 402a may indicate to Target 2 404c how many transactions to execute. Master 0 402a may do so by sending a number over its execute_token 450 bus. Step 462 may occur before, after, or concurrent with Master 0 402a transmitting its transactions at step 460a. In implementations where the number is sent using a Gray code, Master 0 402a may transition the value sent over the execute_token bus 450 over several values to reach the desired value (e.g., from "000" to "001" to "011" to "010" to indicate three). In other implementations, Master 0 402a may send a count, toggle a bit, or use some other mechanism to indicate the number over its execute_token 450 bus. In most cases, the number sent refers only to transactions sent by Master 0 402a. The number sent may not include all the transactions sent by Master 0 402a to Target 2 404c. For example, Master 0 402 may have sent five transactions to Target 2 404c, but sends a count of only three.

Master 0 402a may transmit the number of transactions to execute to Target 2 404c shortly after transmitting its transactions to Target 2 404c, or at some time after. Step 462 may also occur at about the same time that Master 1 402b is transmitting its transactions to Target 2 404c. The concurrence of these events is not problematic, however, because, as noted above, Target 2 404c may not execute the transactions from Master 1 402b at the time that Target 2 404c receives these transactions. Instead, Target 2 404c will hold on to the transactions from Master 1 402b until it is told to execute them.

After receiving the number of transactions to execute from Master 0 402a, Target 2 404c may execute that number of Master 0'2 402a transactions. For this example, the executed transactions include the write to 0x00001234. After completing these transactions, Target 2 404c may, at step 464, indicate to Master 0 402a how many transactions Target 2 404c has executed. Target 2 404c may indicate this number over its release_token bus 452 to Master 0 402a, usually using the same mechanism used to transmit a value over the execute_token bus 450, or otherwise using a Gray code, a numeric value, by toggling bits, or some other mechanism. In some cases, this number may be fewer than the number of transactions that Target 2 404c was instructed to execute by Master 0 402a (e.g., Master 0 402a indicates five transactions and Target 2 404c only executed two). Receiving this number tells Master 0 402a that some or all of its transactions, including, for purposes of this example, the write to 0x00001234, are done. Target 2 404c may also, in some cases, separately send acknowledgements for each executed transaction over the communication channel 420. These may arrive before or after Master 0 402a receives the number of executed transactions.

At step 466, Master 0 402a may notify other devices that it is done writing to 0x00001234. For example, Master 0 402a may transmit a doorbell, or other message, to Target 1 404b, and thereby notify Master 1 402b.

Having received this notification, Master 1 402b may now read address 0x00001234. To do so, at step 468, Master 1 402b may indicate to Target 2 404c how many of its transactions to execute. Master 1 402b may send a value over its execute_token bus 454 using a Gray code, a numeric value, by toggling bits, or some other mechanism. As with Master 0 402a, the number indicated by Master 1 402b over its execute_token bus typically refers to only Master 1's 402b transactions.

Target 2 404c may receive the number transactions to execute from Master 1 402b, and proceed to execute Master 1's 402b transactions. In some cases, Target 2 404c may execute fewer transactions than the number indicates. For purposes of this example, Target 2 404c executes at least the read of address 0x00001234. At step 470a, Target 2 404c sends the data read from the address to Master 1 402b over the communication channel 426 to Master 1 402b. In some cases, Master 1 402b may consider the read transaction done after receiving the data.

At step 470b, Target 2 404c may transmit a number indicating how many of Master 1's transactions it has executed. Target 2 404c may transmit this number over its release_token bus 456 with Master 1 402b, using a Gray code, a numeric value, by toggling bits, or some other mechanism. In most cases, this will occur after Master 1 402b has received the read data, though in some cases it may occur before. In some cases, Master 1 402b may consider its read of 0x00001234 done upon receiving this number from Target 2 404c, where the number indicates that at least the read transaction has been executed.

As noted above, the token busses 450, 452, 454, 456 may, in most cases, be routed separately from the communication fabric 406a. This is so that they need not be constrained by any clocking requirements that may be imposed by the communication fabric 406a. Also noted above is that the token busses 450, 452, 454, 456 may, in some implementations, be asynchronous. This may allow the token busses 450, 452, 454, 456 to be designed without concern for the timing requirements of either the master devices or the target devices. Design of the token busses 450, 452, 454, 456 may otherwise be determined by, for example, the method of transferring data over the token busses 450, 452, 454, 456 and/or the speed of the devices connected at either end. Typically, master devices operate on faster clocks than do target devices. As one example, when using a Gray code to encode data transferred over the token busses 450, 452, 454, 456 a design consideration is whether the code will "wrap around" (that is, transition from its maximum value to its minimum value, e.g., from "100" to "000" according to the encoding given in Table 1) before a target device is able to capture the value. This may be resolved in the number of bits used for each token bus 450, 452, 454, 456. For example, in a computing system where the fastest master device has a clock that is sixteen times faster than the clock of the slowest target device, four bits may be sufficient, in most cases to avoid the problem of wrap-around. Thus the token busses 450, 452, 454, 456 may each be four bits wide.

In some implementations, the example computing system 400 may also include a credit system. As discussed above, a credit system may provide the master devices information about how many transactions target devices can receive at any given time. Similarly, credits may inform a target device of how many transaction responses a master device can receive. The example computing system 400 may benefit from a credit system. Credits may allow the master devices 402a-b to avoid transmitting transactions to Target 2 404c that may not be able to be accepted because Target 2 404c is too busy. The master devices 402a-b can, as an example, reduce the number of transactions they send at steps 460a and 406b to match the number of credits each holds for Target 2 404c. A credit system may thus further assist in reducing system latency.

Even without a credit system, the distributed ordering system illustrated by FIG. 4 may not only reduce overall system latency but also reduce the complexity of the computing system. Complexity may be reduced because a serialization unit may not be needed. This may remove the burden of designing a serialization unit, and the burden of including possibly multiple serialization units in the computing system. Ordering rules can, instead, by implemented by master devices. Implementing ordering rules in mater devices generally requires less complex design. The token busses do not, in most cases, increase the complexity of the design. This is because, first, they are routed separate from the communication fabric, and thus do not increase the complexity of the communication fabric. Second, in implementations where the token busses are asynchronous, there may be little concern about whether the token busses meet timing requirements. Asynchronous busses may also be much faster than the communication fabric, because the speed at which they transmit is only limited by the physical distance between their start and end points, and not by a clock. Additionally, in implementations where the token busses are implemented using a Gray code, the implementation of the token busses is relatively simple. This is because Gray codes are relatively simple and well understood, and operate well over asynchronous busses.

The following table provides a general example of the possible improvement in overall system latency that may be provided by a distributed ordering system. The example latencies are given assuming a computing system with two master devices and one target device, similar to the computing systems illustrated in FIGS. 2-4. The latencies are given for a write transaction from a Master 0, followed by a read transaction to the same address by a Master 1. Both transactions are directed at a Target 2. Master 1 includes a Target 1 for receiving transactions.

The variables used in Table 2 are defined as follows:

X: the latency for a request (wr_req or rd_req) from Master 0 or Master 1 to Target 2.

Y: the latency for a response (wr_rsp or rd_rsp) from Target 2 to either Master 0 or Master 1.

Z: the latency for a notification from Master 0 to Target 1/Master 1 to indicate that Master 0's transaction is done.

T: the latency for transmitting a value over a token bus. The value may be sent over either an execute_token (exe_token) or release_token (rel_token) bus.

The Simpler Ordering example in Table 2 describes a computing system that does not include an ordering model, other than possibly a simple system that requires transactions to be executed by Target 2 sequentially.

The Serialization Unit example describes a computing system that may include a serialization unit, such as is described with respect to FIG. 2. In this example, the latency experienced by Master 0 is the latency from each master device to or from the serialization unit, rather than the latency to or from Target 2, because Mater 0's write transaction is received by the serialization unit. Hence, in this example this latency is X/2. Similarly, the serialization unit responds to Master 0's write transaction, so the latency for the response is Y/2. Master 1's read transaction, however, must make the full round trip from Master 1 to Target 2 and back.

The Distributed Ordering example describes a computing system that may include a distributed ordering system, as is described with respect to FIG. 4. In this example, it is assumed that Master 1 transmits its read request concurrently with Master 0 transmitting its write request, or at least before Master 0 receives a value of its release_token bus with Target 2. Because the latency for the read transaction is concurrent with other latencies, it need not be accounted for. This example also does not include the latency for a value to be transmitted over the release_token bus from Target 2 to Master 1, because Master 1's read transaction may be considered complete when Master 1 receives the read data.

TABLE 2

Example Comparison of Latencies Between Different Systems

| | |
|---|---|
| Simple Ordering | Master 0 latency: X(wr_req) + Y(wr_rsp)<br>Master 1 latency: X(rd_req) + Y(rd_rsp)<br>Overall latency:<br>X(wr_req) + Y(wr_rsp) + Z(wr_req) +<br>X(rd_req) + Y(rd_rsp) = 2X + 2Y + Z |
| Serialization Unit | Master 0 latency: X/2(wr_req) + Y/2(wr_rsp)<br>Master 1 latency: X(rd_req) + Y(rd_rsp)<br>Overall latency:<br>X/2(wr_req) + Y/2(wr_rsp) + Z(wr_req) +<br>X(rd_req) + Y(rd_rsp) = 1.5X + 1.5Y + Z |
| Distributed Ordering | Master 0 latency: X(wr_req) + T(rel_token)<br>Master 1 latency: T(exe_token) + Y(rd_rsp)<br>Overall latency:<br>X(wr_req) + T(rel_token) + Z(wr_req) +<br>T(exe_token) + Y(rd_rsp) = X + Y + Z + 2T |

As illustrated in Table 2, while the Serialization Unit system may provide some improvement over the Simple Ordering system, the Distributed Ordering system may nearly halve the latency of the Simple Ordering system. In most cases, the latency for transmitting a value over a token bus is significantly lower than the latency for transmitting transactions and responses over a communication fabric. Hence, the delay added by the token busses is likely to be much smaller than the transaction or response latency.

Methods of Distributed Ordering of Transactions

Figure 5:
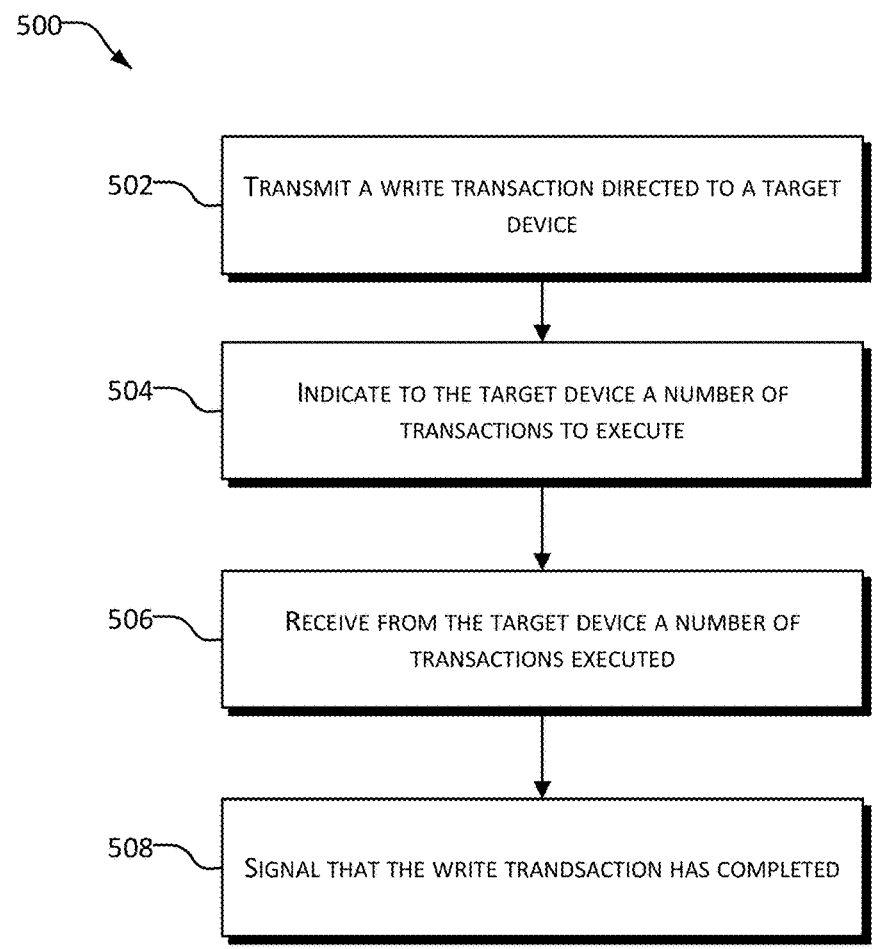
FIG. 5 illustrates one example of a process for distributed ordering of transactions, for maintaining the order of the transactions.

FIG. 5 illustrates one example of a process for distributed ordering of transactions, for maintaining the order of the transactions. The illustrated process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 5 illustrates an example of a process 500 that may be used to maintain the order of transactions directed at the same address. The process 500 may be implemented by a computing system, such as for example the computing system illustrated in FIG. 1. In some implementations, the steps of the process 500 of FIG. 5 may be executed by a device within the computing system that is operable to originate transactions, such as for example a master device.

At step 502, the computing system may transmit a write transaction directed to a target device. The write transaction may be directed to a target device by including an address that is within the address space of the target device. The write transaction may be one of multiple transactions transmitted at the same time. The write transaction will, in most cases, modify the value at the targeted address. Hence transactions that follow, including both read and write transactions, should not access the address before the write transaction, or else they may access incorrect data. The order of these transactions may be maintained by the following steps.

At step 504, the computing system may indicate to the target device a number of transactions to execute. This number of transactions includes at least the write transaction from step 502. In some implementations, the number of transactions may be indicated to the target device using a Gray code. In some implementations, the number may be indicated using token bus, which may be called an execute_token bus. The execute_token bus may be a point-to-point communication channel between the originator of the transaction (e.g., a master device) and the target device. In some implementations, the execute_token bus is routed separately from transactions that are directed at the target device. In some implementations, the execute_token bus is asynchronous.

At step 506, the computing system may receive, from the target device, a number of transactions executed by the target device. Thus number may indicate that at least the write transaction from step 502 was executed. In some implementations, the number of transactions executed may be indicated using a Gray code. In some implementations, the number may be indicated using a token bus, which may be called a release_token bus. The release_token bus may be a point-to-point communication channel between the target device and the originator of the transactions (e.g., a master device). In some implementations, the release_token bus is routed separately from responses that may be transmitted from the target device to the originator of the transactions. In some implementations, the release_token bus is asynchronous. In some implementations, the number of transactions executed may be fewer than the number of transactions that were indicated at step 504.

At step 508, the computing system may signal that the write transaction has completed. It may do so because the number indicated at step 506 may have indicated that the write transaction has completed. The signal indicating that the write transaction has completed may be transmitted to some or all devices in the computing system that may originate transactions. For example, the signal may take the form of a doorbell. The doorbell may be directed at a specific transaction originator (e.g., one that is waiting to transmit a transaction to the same address as was access by the write transaction), to several transaction originators (e.g., to signal that they may all now access the address), or to all transaction originators (e.g., as a general broadcast message).

After step 508, other transaction originators may read and/or write the address written by the write transaction from step 502. These subsequent read and write transactions may also follow the process 500, so that these and other transactions to the same address may be kept in order.

Adjusting Order of Execution

Figure 6:
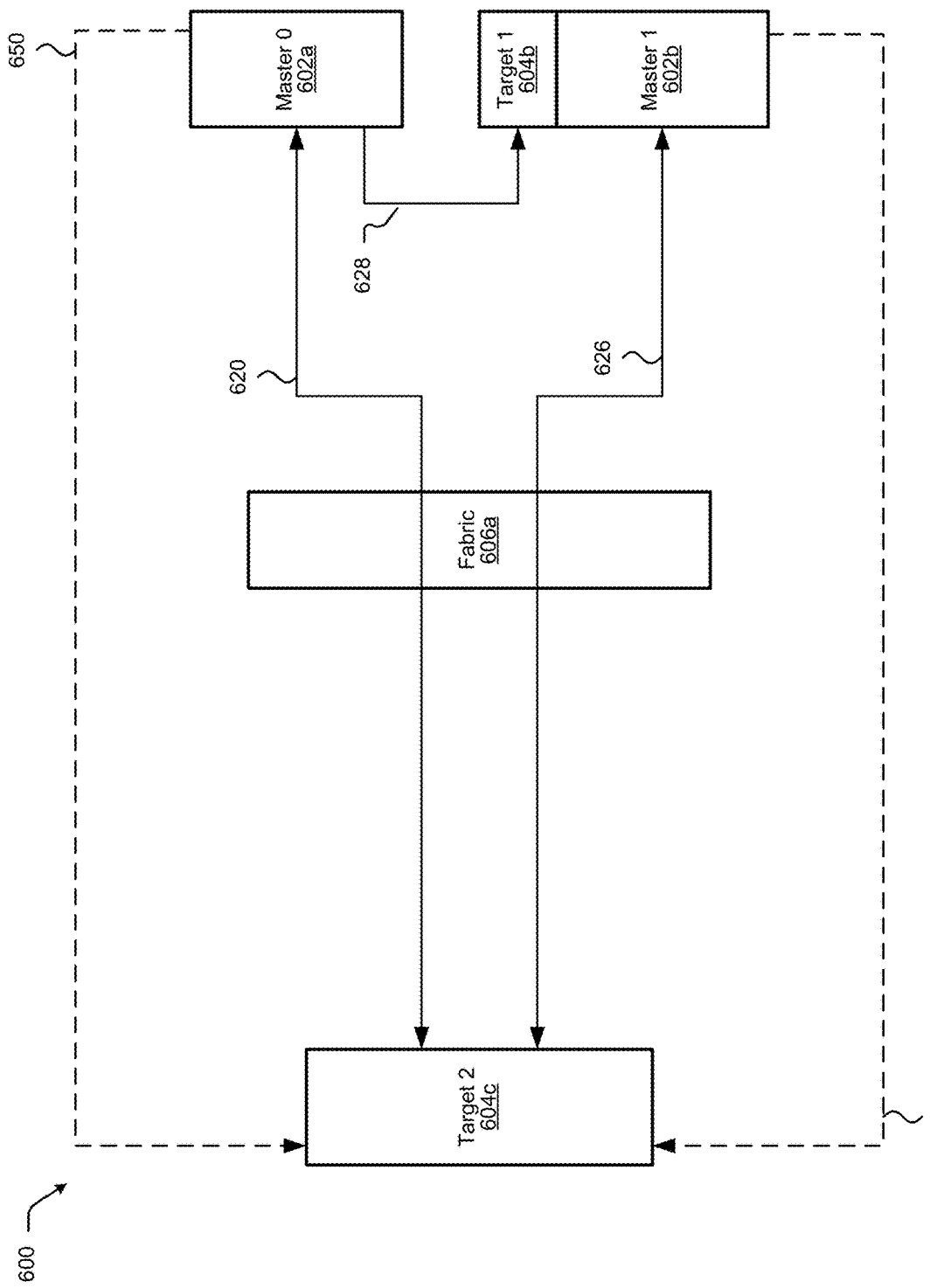
FIG. 6 illustrates a high-level block diagram of a computing system for adjusting an order of execution of a target.

FIG. 6 illustrates a computing system 600 that includes two master devices 602a-b, Master 0 602a and Master 1 602b, in communication with a communication fabric, Fabric 606a. Computing system 600 may be implemented as a system-on-chip. Master 1 602b also includes an associated target device, Target 1 604b, for receiving transactions. Also illustrated is a target device, Target 2 604c, which is also in communication with the communication Fabric 606a. FIG. 6 shows Master 0 602a may communicate with Target 2 604c over transaction bus 620, which passes through the communication Fabric 606a. Master 1 602b may also communicate with Target 2 604c over transaction bus 626, which also passes through communication Fabric 606a. While transaction busses 620 and 626 are illustrated separately, they may be separate connections, one shared connection, or a combination of separate and shared connections. Transaction busses 620 and 626 are generally synchronous busses.

Master 0 602a may also have a communication channel 628 for communicating to other master devices. Master 0 602a may use the communication channel 628 to send messages and/or notifications to other master devices. In the illustrated example, the communication channel 628 from Master 0 602a is connected to Target 1 604b, the target device associated with Master 1 602b. Master 1 602b may include Target 1 604b in order to be able to receive messages and notifications from other master devices.

The example computing system 600 also includes command busses 650 and 654. The command busses in this example are point-to-point connections between each of the master devices and Target 2 604c. "Point-to-point" in this context means a connection between only two devices. For example, command bus 650 provides communication between Master 0 602a and Target 2 604c. In a similar fashion, command bus 654 provides communication from Master 0 602b to Target 2 604c. Command busses 650 and 654 may be unidirectional or bidirectional.

In one implementation, command busses 650 and 654 operate independently of the communication Fabric 606a. For example, command busses 650 and 654 may be routed separately from the communication Fabric 606a. This means that the data transferred over the command busses 650 and 654 does not need to pass through the communication Fabric 606a to reach its destination, in this implementation. This also means that, in at least some implementations, data transferred over command busses 650 and 654 may reach its destination faster than data that must pass through the communication Fabric 606a. In some implementations, the command busses 650 and 654 may be synchronous in that they require a clock signal to drive send and receive data over the command bus.

Master device 0 602a may initiate a transaction by sending a first transaction to Target device 2 604c over transaction bus 620, through switch Fabric 0 606a. Where Target 604c is a memory-mapped device, the first transaction may be a read transaction, a write transaction, or a control transaction, for example. The transaction includes a transaction identifier. In one embodiment, the transaction includes an eight-bit transaction identifier and a four-bit command field that specifies the command. A write transaction may also include an address and data to write to the address. A read transaction may include an address for data to be read from.

Subsequent to Master 0 602a sending the first transaction over transaction bus 620, Master 0 602a may transmit an ordering message to Target device 604c over command bus 650. In one implementation, Master 0 602a sends ordering message to Target device 604c over command bus 650 prior to sending the first transaction to Target device 604c over transaction bus 620. Target device 604c may receive the ordering message before or after receiving the first transaction. Command bus 650 may be routed through Fabric 606a or may be a stand-alone bus that is not routed through Fabric 606a. The ordering message sent to Target device 604c includes a transaction identifier, which may be an eight bit field, in one implementation. The ordering message may also include a command field that indicates an adjustment of the order of execution that the Target device 604c should make. Target device 604c adjusts its order of execution in response to receiving the ordering message. For example, the ordering message may identify the first transaction by including the transaction identifier of the first transaction and also include a cancelling command in the command field. In this case, Target device 604c will cancel the first transaction from being executed. For example, the first transaction (identified by its transaction identifier) may be removed from an execution pipeline queue of Target device 604c. Hence, a master device can essentially pull back a transaction that has already been sent to a target device. Where command bus 650 is routed outside of Fabric 606a, command bus 650 may reach Target 604c faster when compared with having command bus 650 transmit through Fabric 606a.

Target device 604c may also adjust its order of execution in response to receiving an ordering message by repositioning or reprioritizing a transaction that has been received by Target device 604c. For example, after sending the first transaction, Master device 0 602a may also send a second transaction to Target device 604c. Consequently, Target device 604c may receive the first transaction prior to receiving the second transaction. The first transaction may be put in an execution pipeline queue of Target device 604c prior to the second transaction. Since the first transaction is ahead of the second transaction in the execution pipeline queue, Target device 604c would be scheduled to process the first transaction prior to the second transaction. However, Master device 0 602a may send an ordering message to Target device 604c via command bus 650 that puts the second transaction ahead of the first transaction in the execution pipeline queue. In one embodiment, the ordering message from Master device 602a includes the transaction identifier of the second transaction and the command field of the ordering message includes a priority command. The priority command causes Target device 604c to reposition the second transaction in the execution pipeline queue of Target device 604c such that second transaction is executed prior to the first transaction even though the first transaction was received by Target device 604c prior to the second transaction. The command field of the ordering message may include a specific queue position or a priority ranking, for example. The queue position or ranking position included in the command field may cause Target device 604c to execute the second transaction prior to the first transaction, for example.

In one implementation, the first and second transactions are sent by different master devices. For example, Master 0 602a may send the first transaction and Master 1 602b may send the second transaction. Master 1 602b may send the second transaction to Target device 604c over transaction bus 626. The second transaction includes a second transaction identifier. Master 1 602b may also send a second ordering message to Target device 604c over second command bus 654. The second ordering message includes the second transaction identifier and a second ordering command. The Target device 604c is configured to adjust the execution order of the second transaction by the Target device 604c in response to receiving the second ordering message from Master 1 602b. The second ordering command (included in the second ordering message) may dictate the adjustment in the order of execution that Target device 604c makes. For example, the second ordering message may identify the second transaction by including the second transaction identifier of the second transaction and also include a cancelling command in the command field of the second ordering message. In this case, Target device 604c will cancel the second transaction from being executed. For example, the second transaction (identified by the second transaction identifier) may be removed from the execution pipeline queue of Target device 604c. Target device 604c may also adjust its order of execution in response to receiving the second ordering message by repositioning or reprioritizing the second transaction that has been received by Target device 604c. The repositioning or reprioritizing of the second transaction may move the second transaction ahead of the first transaction in the execution pipeline queue of Target device 604c. Putting the second transaction ahead of the first transaction in the execution pipeline queue may move the first transaction farther down in the execution pipeline queue.

In an implementation where Target device 604c is a memory-mapped device, Master 0 602a may notify other devices that it is done writing to a certain address of Target device 604c. For example, Master 0 602a may transmit a doorbell or other message to Target 1 604b via communication channel 628 and thereby notify Master 1 602b. Having received this notification, Master 1 602b may now read the address of Target device 604c that Master 0 602a has indicated it has written to.

Although not specifically illustrated in FIG. 6, an ordering controller may be communicatively coupled to target device 2 604c to send the ordering message to target device 2 604c. In this implementation, command busses 650 and 654 may be replaced with a command bus between the ordering controller and target device 2 604c to so that the ordering controller can transmit the ordering messages to target device 2 604c over the command bus. The ordering message from the ordering controller will still include a transaction identifier and an ordering command, as described above. In one embodiment, the ordering controller is a processor. The ordering controller may have access to a memory shared by one or more masters (e.g. master 602a and/or 602b) that stores the transaction identifiers associated with transactions that the master devices have transmitted to the target device 604c over the transaction busses 620 and 626. The ordering controller may also gain access to the transaction identifiers by a data bus coupled between the ordering controller and the masters that sent the transactions over the transaction busses 620 and 626.

Methods of Adjusting Order of Execution of Target

Figure 7:
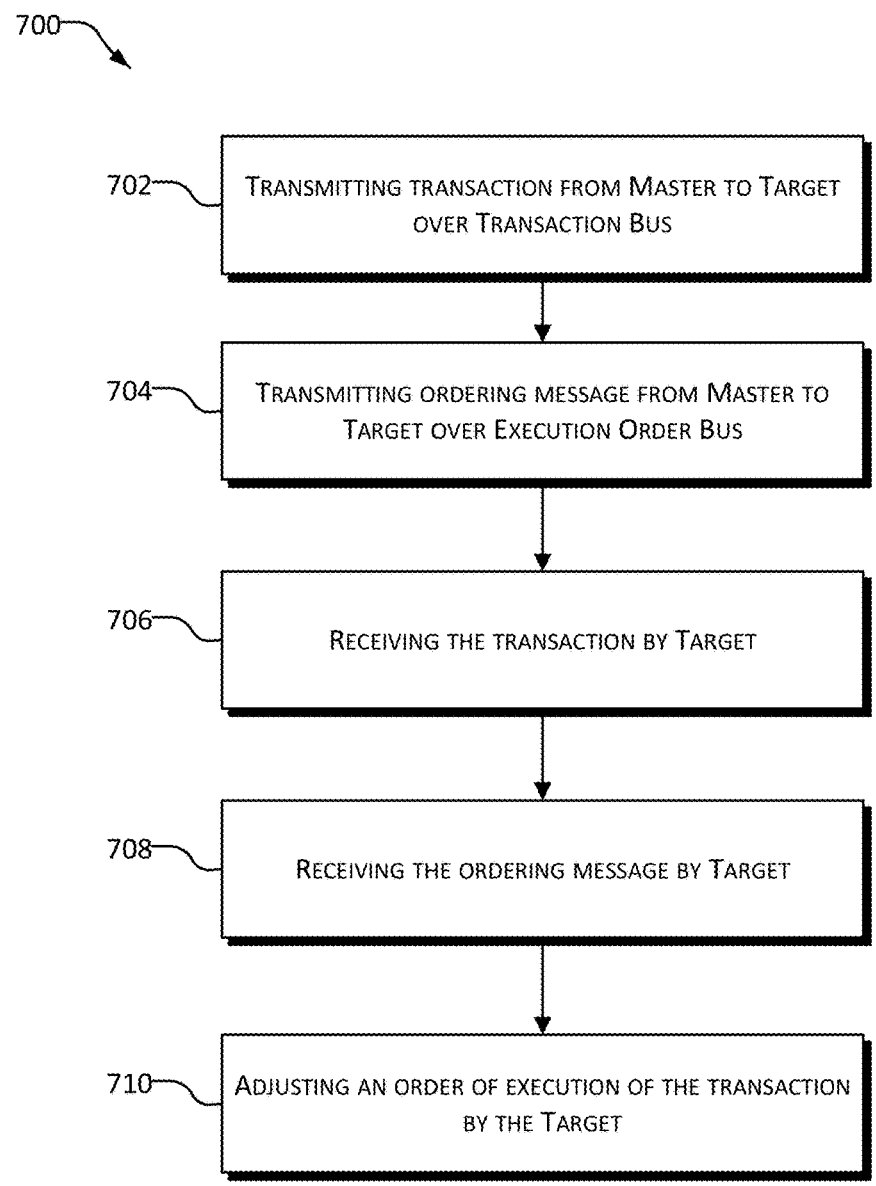
FIG. 7 illustrates one example of a process of adjusting an order of execution of a target.

FIG. 7 illustrates one example of a process 700 of adjusting an order of execution of a target device. The illustrated process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The process 700 may be implemented by a computing system, such as for example the computing system illustrated in FIG. 6. The order in which the operations of process 700 are described is not intended to be construed as a limitation, and any number of the described operations can be omitted or combined in any order and/or in parallel to implement this process and any other processes described herein.

At process block 702 of process 700, a transaction is transmitted from a master device (e.g. Master 602a) to a target device (e.g. Target 604c) over a transaction bus (e.g. bus 620). The transaction includes a transaction identifier that is unique to the transaction. The master device transmits an ordering message to the target device over a command bus (e.g. bus 650), in process block 704. The ordering message includes the transaction identifier of the transaction that was sent from the master device to the target device over the transaction bus. The transaction is received by the target device in process block 706. The ordering message is received by the target device in process block 708. The ordering message is received by the target device subsequent to the target device receiving the transaction, in one implementation. In process block 710, the target device adjusts an order of execution of the transaction (by the target device) based at least in part on receiving the ordering message from the master device.

Adjusting the order of execution may include cancelling the transaction identified by the transaction identifier, in one implementation. In one example implementation, adjusting the order of execution includes executing the transaction with the target device prior to executing a prior transaction that was received by the target device prior to the transaction. The target device may analyze a command field of the ordering message to reposition the transaction ahead of the prior transaction in an execution pipeline queue of the target device, for example.

Computing Systems

Figure 8:
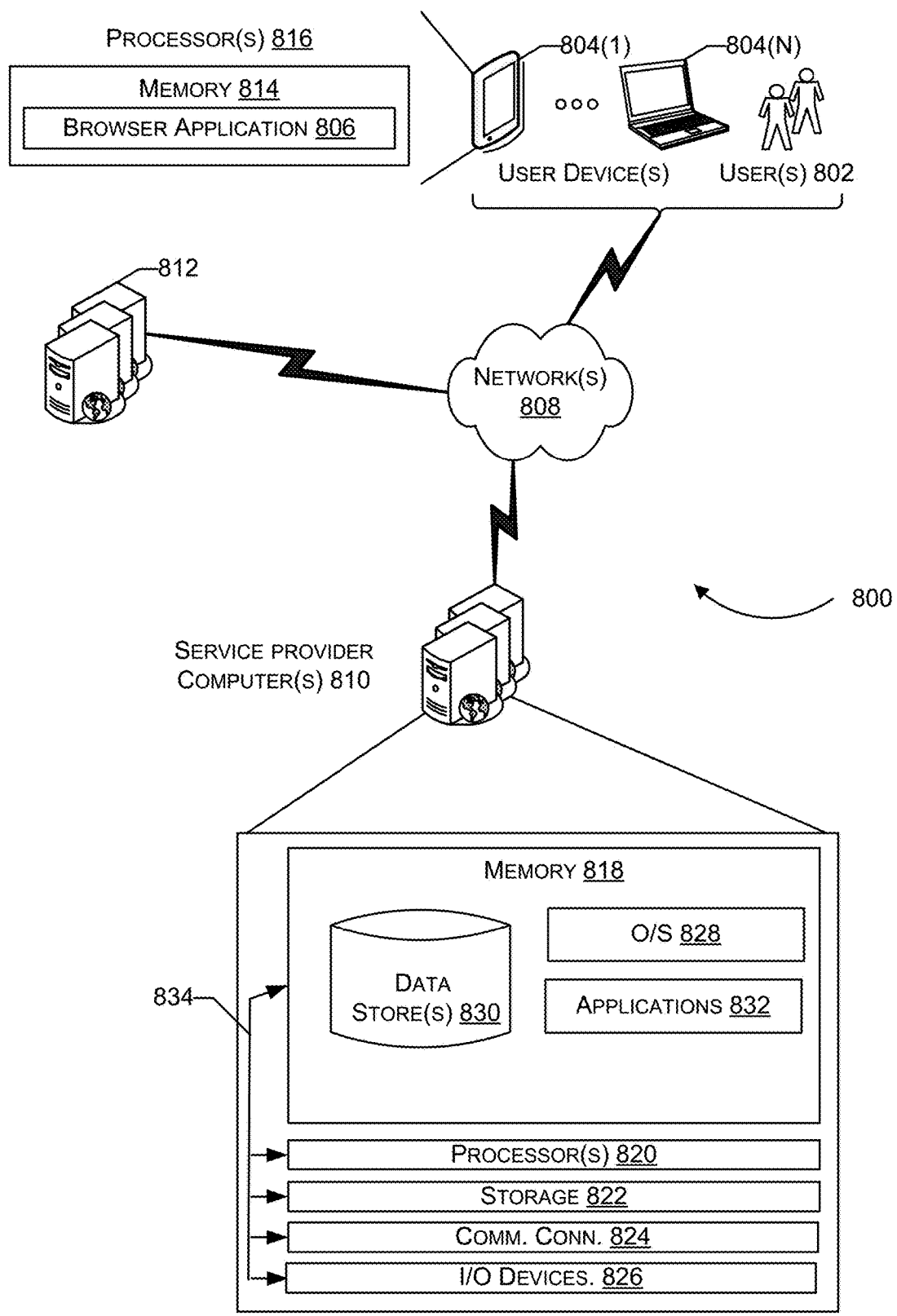
FIG. 8 illustrates an example architecture for features and systems described herein that includes one or more service provider computers and/or a user device connected via one or more networks, according to some embodiments.

FIG. 8 illustrates an example architecture for features and systems described herein that includes one or more service provider computers and/or a user device connected via one or more networks. The devices discussed in FIGS. 1-4 and 6 may use one or more components of the computing devices described in FIG. 8 or may represent one or more computing devices described in FIG. 8. In the illustrated architecture 800, one or more users 802 may use user computing devices 804(1)-(N) to access an application 806 (e.g., a web browser or mobile device application), via one or more networks 808. In some aspects, the application 806 may be hosted, managed, and/or provided by a computing resources service or service provider. One or more service provider computers 810 may provide a native application that is configured to run on the user devices 804, which user(s) 802 may interact with. The service provider computer(s) 810 may, in some examples, provide computing resources such as, but not limited to, client entities, low latency data storage, durable data storage, data access, management, virtualization, cloud-based software solutions, electronic content performance management, and so on. The service provider computer(s) 810 may also be operable to provide web hosting, computer application development and/or implementation platforms, combinations of the foregoing or the like to the user(s) 802. The service provider computer(s) 810, in some examples, may communicate with one or more third party computers 812.

In some examples, network(s) 808 may include any one or a combination of many different types of networks, such as cable networks, the Internet, wireless networks, cellular networks and other private and/or public networks. While the illustrated example represents the user(s) 802 accessing an application 806 over the network(s) 808, the described techniques may equally apply in instances where the user(s) 802 interact with the service provider computer(s) 810 via user device(s) 804 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, the application 806 may allow the user(s) 802 to interact with the service provider computer(s) 810 to, for example, access web content (e.g., web pages, music, video, etc.). The service provider computer(s) 810, which may be arranged in a cluster of servers or as a server farm, may host the application 806 and/or cloud-based software services. Other server architectures may also be used to host the application 806. The application 806 may be capable of handling requests from many users 802 and serving, in response, various item web pages. The application 806 can provide any type of website that supports user interaction, including social networking sites, online retailers, informational sites, blog sites, search engine sites, news and entertainment sites, and so forth. As discussed above, the described techniques can similarly be implemented outside of the application 806, such as with other applications running on the user device(s) 804.

The user device(s) 804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 804 may be in communication with the service provider computer(s) 810 via the network(s) 808, or via other network connections. Additionally, the user device(s) 804 may be part of the distributed system managed by, controlled by, or otherwise part of the service provider computer(s) 810 (e.g., a console device integrated with the service provider computers 810).

In one illustrative configuration, a user device(s) 804 may include at least one memory 814 and one or more processing units (or processor(s) 816). The processor(s) 816 may be implemented in hardware, computer-executable instructions, firmware, or combinations thereof.

Computer-executable instruction or firmware implementations of the processor(s) 816 may include computer-executable or machine-executable instructions written in any suitable programming language to perform the various functions described. The user device(s) 804 may also include geo-location devices (e.g., a global positioning system (GPS) device or the like) for providing and/or recording geographic location information associated with the user device(s) 804.

The memory 814 may store program instructions that are loadable and executable on the processor(s) 816, as well as data generated during the execution of these programs. Depending on the configuration and type of the user device(s) 804, the memory 814 may be volatile (such as random access memory (RAM)) and/or non-volatile (such as read-only memory (ROM), flash memory, etc.). The user device(s) 804 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM.

Turning to the contents of the memory 814 in more detail, the memory 814 may include an operating system and one or more application programs or services for implementing the features disclosed herein including at least a user provided input element or electronic service web page, such as via a browser application 806 or dedicated applications (e.g., smart phone applications, tablet applications, etc.). The browser application 806 may be configured to receive, store and/or display a website or other interface for interacting with the service provider computer(s) 810. Additionally, the memory 814 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 804.

In some aspects, the service provider computer(s) 810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 810 may be in communication with the user device(s) 804 and/or other service providers via the network(s) 808, or via other network connections. The service provider computer(s) 810 may include one or more servers, perhaps arranged in a cluster, as a server farm, or as individual servers not associated with one another. These servers may be configured as part of an integrated, distributed computing environment.

In one illustrative configuration, the service provider computer(s) 810 may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the service provider computer(s) 810, the memory 818 may be volatile (such as RAM) and/or non-volatile (such as ROM, flash memory, etc.). The service provider computer(s) 810 or servers may also include additional storage 822, which may include removable storage and/or non-removable storage. The additional storage 822 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818, the additional storage 822, both removable and non-removable are all examples of computer-readable storage media. For example, computer-readable storage media may include volatile or non-volatile, removable or non-removable media implemented in any method or technology for storage of information such as computer-readable instructions, data structures, program modules, or other data. The memory 818 and the additional storage 822 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 810 may also contain communications connection(s) 824 that allow the service provider computer(s) 810 to communicate with a stored database, another computing device or server, user terminals and/or other devices on the network(s) 808. The service provider computer(s) 810 may also include I/O device(s) 826, such as a keyboard, a mouse, a pen, a voice input device, a touch input device, a display, speakers, a printer, and the like. The communication connection(s) 824 and I/O device(s) 826, along with the storage 822, may be described as peripheral devices.

The memory 818 may include an operating system 828, one or more data stores 830 and/or one or more application programs 832 or services for implementing the features disclosed herein.

The service provider computer(s) 810 may also include one or more communication channels 834. A communication channel 834 may provide a medium over which the various components of the service provider computer 810 can communicate. The communication channel or channels 834 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

Figure 9:
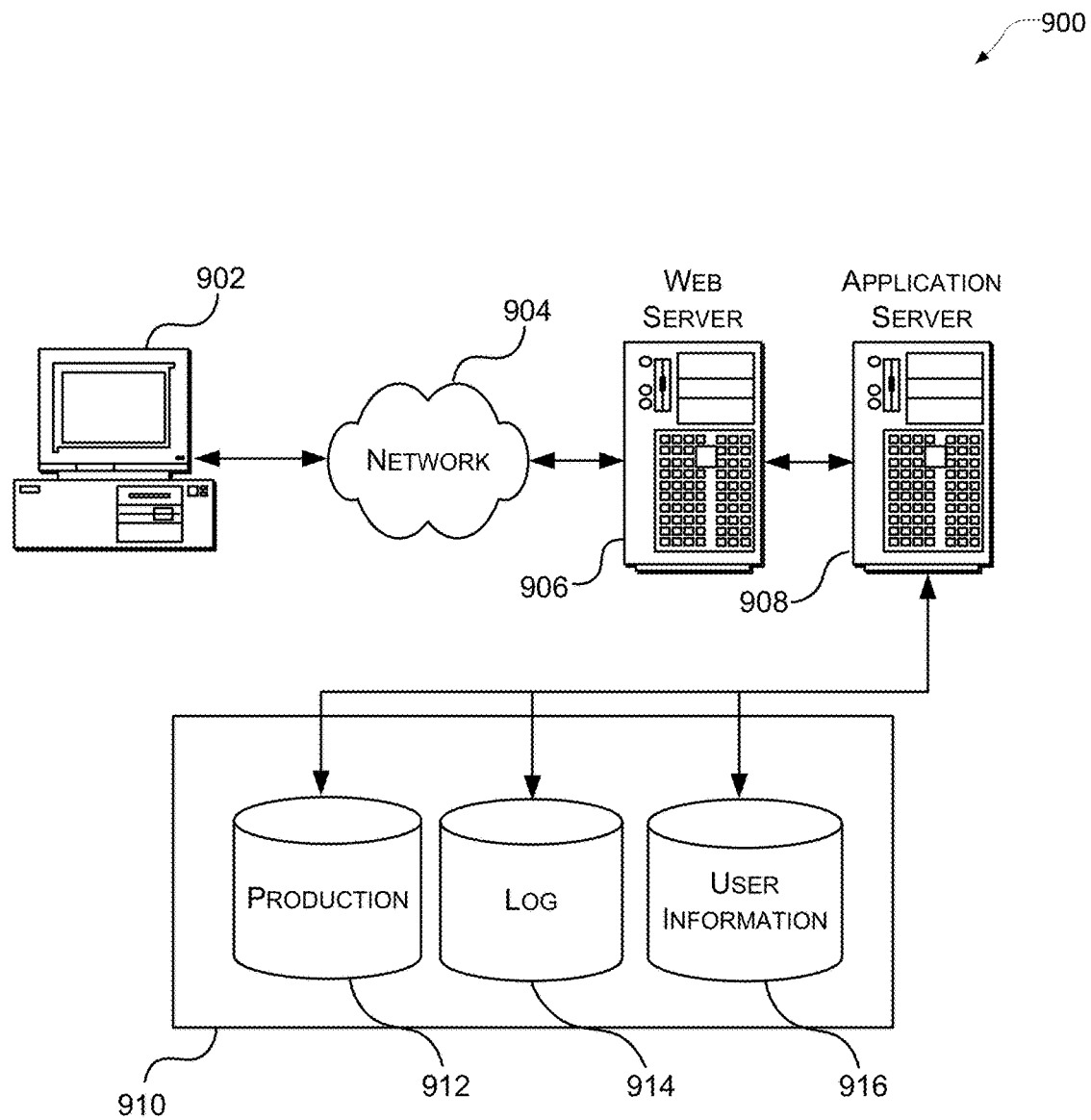
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system-on-chip, comprising:
a master device operable to initiate transactions;
a target device operable to receive the transactions;
a communication fabric for transferring the transactions from the master device to the target device; and
a command bus communicatively coupled between the master device and the target device, wherein the command bus is a synchronous bus routed outside the communication fabric;
wherein the master device is configured to:
transmit a first transaction to the target device over the communication fabric, wherein the first transaction includes a first transaction identifier;
transmit a second transaction to the target device over the communication fabric after transmitting the first transaction, wherein the second transaction includes a second transaction identifier; and
transmit an ordering message to the target device over the command bus, wherein the ordering message includes the first transaction identifier and an ordering command, wherein the target device is configured to adjust an execution order on the target device of the first transaction relative to the second transaction based on receiving the ordering message.

2. The system-on-chip of claim 1, wherein the ordering command is a cancelling command, and wherein adjusting the execution order on the target device includes cancelling the first transaction from being executed by the target device.

3. The system-on-chip of claim 1, wherein the ordering command is a priority command, and wherein, in response to the priority command, the target device places the first transaction behind the second transaction in an execution pipeline queue of the target device.

4. A system-on-chip, comprising:
a first master device operable to initiate a first set of transactions;
a second master device operable to initiate a second set of transactions;
a target device operable to receive the first set of transactions and the second set of transactions;
a communication fabric for transferring the first set of transactions and the second set of transactions from the first master device and the second master device to the target device;
a first command bus communicatively coupled between the first master device and the target device; and
a second command bus communicatively coupled between the second master device and the target device, wherein the first command bus and the second command bus are synchronous busses routed outside the communication fabric;
wherein the first master device is configured to:
transmit a first transaction to the target device over the communication fabric, wherein the first transaction includes a first transaction identifier;
wherein the second master device is configured to:
transmit a second transaction to the target device, wherein the second transaction includes a second transaction identifier; and
transmit an ordering message to the target device over the second command bus, wherein the ordering message includes the second transaction identifier and an ordering command, wherein the target device is configured to adjust an execution order on the target device of the second transaction relative to the first transaction based on information provided by the ordering message.

5. The system-on-chip of claim 4, wherein the first transaction is received by the target device after receiving the ordering message.

6. The system-on-chip of claim 4, wherein the first transaction is received by the target device before the second transaction, wherein the ordering command is a priority command, and wherein the target device places the second transaction ahead of the first transaction.

7. The system-on-chip of claim 4, wherein adjusting the execution order includes cancelling the first transaction from being executed by the target device.

8. The system-on-chip of claim 4, wherein the first master device comprises a processor.

9. The system-on-chip of claim 4, wherein the target device includes a memory-mapped device.

10. The system-on-chip of claim 4, wherein the first transaction includes a read command, a write command, or a control command.

11. A computer-implemented method, comprising:
transmitting, by a master device of a system-on-chip, a first transaction to a target device of the system-on-chip over a communication fabric, wherein the first transaction includes a first transaction identifier;
transmitting, by the master device, a second transaction to the target device over the communication fabric after transmitting the first transaction, where the second transaction includes a second transaction identifier;
transmitting, by the master device, an ordering message to the target device over a command bus, wherein the ordering message includes the first transaction identifier and an ordering command, and wherein the command bus is a synchronous bus routed outside the communication fabric;
receiving, by the target device, the first transaction;
receiving, by the target device, the second transaction;
receiving, by the target device, the ordering message; and
adjusting, by the target device, an execution order on the target device of the first transaction relative to the second transaction based on receiving the ordering message.

12. The computer-implemented method of claim 11, wherein the first transaction is received by the target device before the target device receives the second transaction, wherein adjusting the execution order includes executing the first transaction on the target device after to executing the second transaction.

13. The computer-implemented method of claim 11, wherein the first transaction is a read transaction and the second transaction is a write transaction.

14. The computer-implemented method of claim 11, wherein adjusting the execution order includes cancelling the first transaction from being executed by the target device.

15. The computer-implemented method of claim 11, wherein the first transaction and the second transaction are received by the target device prior to receiving the ordering message.

16. A computing device comprising:
- a master device operable to initiate transactions;
- a target device operable to receive the transactions;
- a communication fabric for transferring the transactions from the master device to the target device;
- an ordering controller; and
- a command bus communicatively coupled between the ordering controller and the target device, wherein the command bus is a synchronous bus routed outside the communication fabric;

wherein the master device is configured to:
- transmit a first transaction to the target device over the communication fabric, wherein the first transaction includes a transaction identifier; and
- transmit a second transaction to the target device over the communication fabric after transmitting the first transaction, wherein the second transaction includes a second transaction identifier;

and wherein the ordering controller is configured to:
- transmit an ordering message to the target device over the command bus, the ordering message including the second transaction identifier and an ordering command, wherein the target device is configured to adjust an execution order on the target device of the first transaction relative to the second transaction based on information provided by the ordering message from the ordering controller.

17. The system-on-chip of claim 1, wherein the first transaction is received by the target device after receiving the ordering message.

18. The system-on-chip of claim 1, wherein target device receives the ordering message before receiving the first transaction or the second transaction.

19. The system-on-chip of claim 1, wherein the master device comprises a processor.

20. The system-on-chip of claim 1, wherein the target device includes a memory-mapped device.

21. The system-on-chip of claim 4, wherein target device receives the ordering message before receiving the first transaction or the second transaction.

* * * * *